(12) United States Patent
Hörmann

(10) Patent No.: US 6,280,358 B1
(45) Date of Patent: Aug. 28, 2001

(54) GATE DRIVE ASSEMBLY

(75) Inventor: Michael Hörmann, Halle (DE)

(73) Assignee: Marantec Antriebs-und Steuerungstechnik GmbH & Co. KG, Marienfeld (DE)

( * ) Notice: Subject to any disclaimer, the term of this patent is extended or adjusted under 35 U.S.C. 154(b) by 0 days.

(21) Appl. No.: 09/308,656

(22) PCT Filed: Sep. 30, 1998

(86) PCT No.: PCT/EP98/06209

§ 371 Date: Jul. 26, 1999

§ 102(e) Date: Jul. 26, 1999

(87) PCT Pub. No.: WO99/17036

PCT Pub. Date: Apr. 8, 1999

(30) Foreign Application Priority Data

Sep. 30, 1997 (DE) ............................... 197 43 254
Oct. 10, 1997 (DE) ............................... 197 44 950

(51) Int. Cl.[7] ............................. F16H 7/00; F16H 27/02; B66F 1/00
(52) U.S. Cl. ............................. 474/68; 474/67; 74/89.22; 254/387
(58) Field of Search .................. 74/89.22; 254/335–337, 254/364, 393, 414, 276, 387; 474/66, 67, 68, 64, 65

(56) References Cited

U.S. PATENT DOCUMENTS

| 135,513 | * | 2/1873 | Bond ........................................ 474/68 |
| 320,544 | * | 6/1885 | Dodge ...................................... 474/68 |
| 425,543 | * | 4/1890 | Hillstrom ................................ 474/67 |
| 1,734,546 | * | 11/1929 | Veling ............................ 74/89.22 X |
| 3,039,318 | * | 6/1962 | Clarke .................................. 74/89.22 |
| 3,223,199 | * | 12/1965 | Schwehr ............................ 254/387 X |
| 3,630,096 |   | 12/1971 | Brewer ............................. 74/242.1 A |

FOREIGN PATENT DOCUMENTS

| 442 387 |   | 3/1927 | (DE) . |
| 527 420 |   | 6/1931 | (DE) . |
| 36 24 324 |   | 1/1988 | (DE) . |
| 57971 | * | 8/1980 | (DK) . |
| 0 471 159 |   | 2/1992 | (EP) . |
| 0 757 190 |   | 2/1997 | (EP) . |
| 682188 | * | 3/1930 | (FR) . |
| 413450 |   | 7/1934 | (GB) . |

* cited by examiner

Primary Examiner—David A. Bucci
Assistant Examiner—Marcus Charles
(74) Attorney, Agent, or Firm—Jacobson, Price, Holman & Stern, PLLC

(57) ABSTRACT

A drive, preferably a gate drive with a belt transmission encompassing a drive pulley and an output pulley. According to the invention the drive pulley consists of at least one cylinder with inwardly tapering flanges at its ends. A round belt, rope or similar serves as a drive agent, which is wound a number of times around the cylinder. The return strand of the round belt, rope or similar can be held continuously under tension.

14 Claims, 6 Drawing Sheets

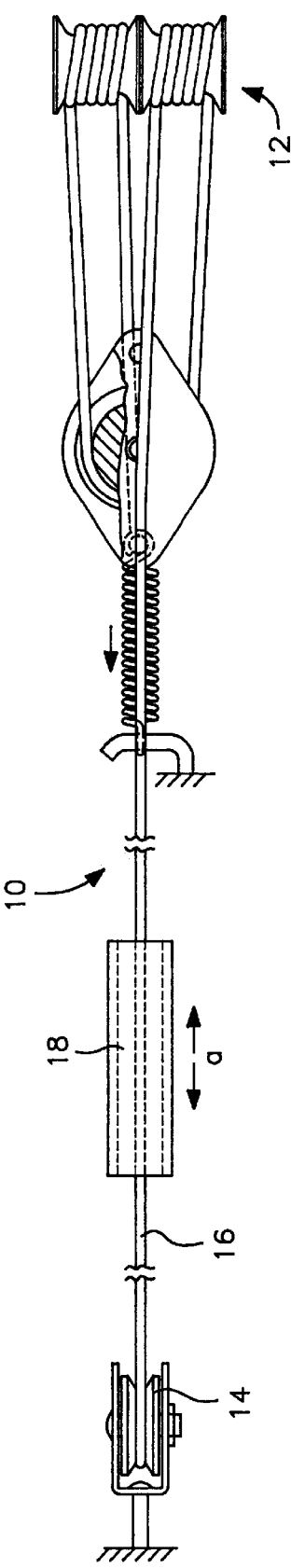
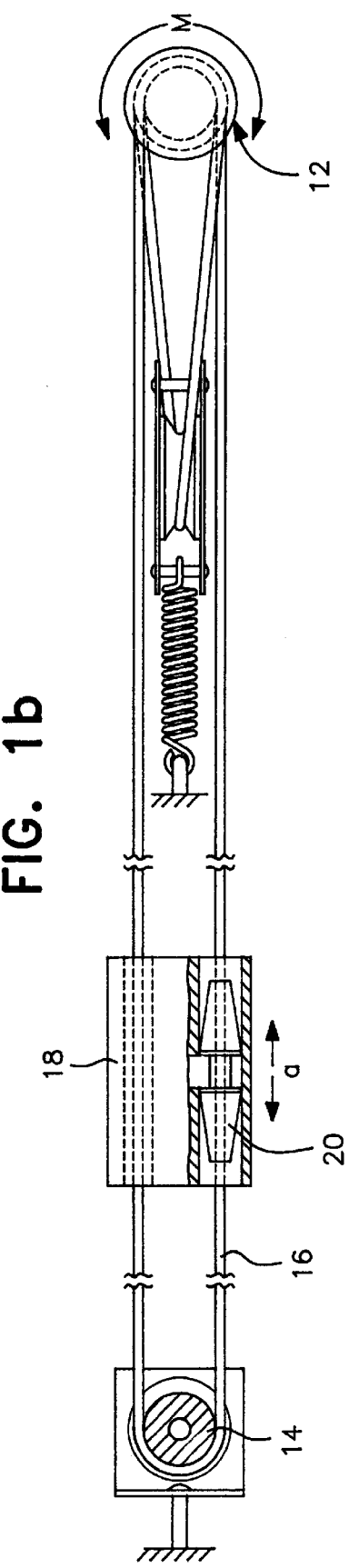

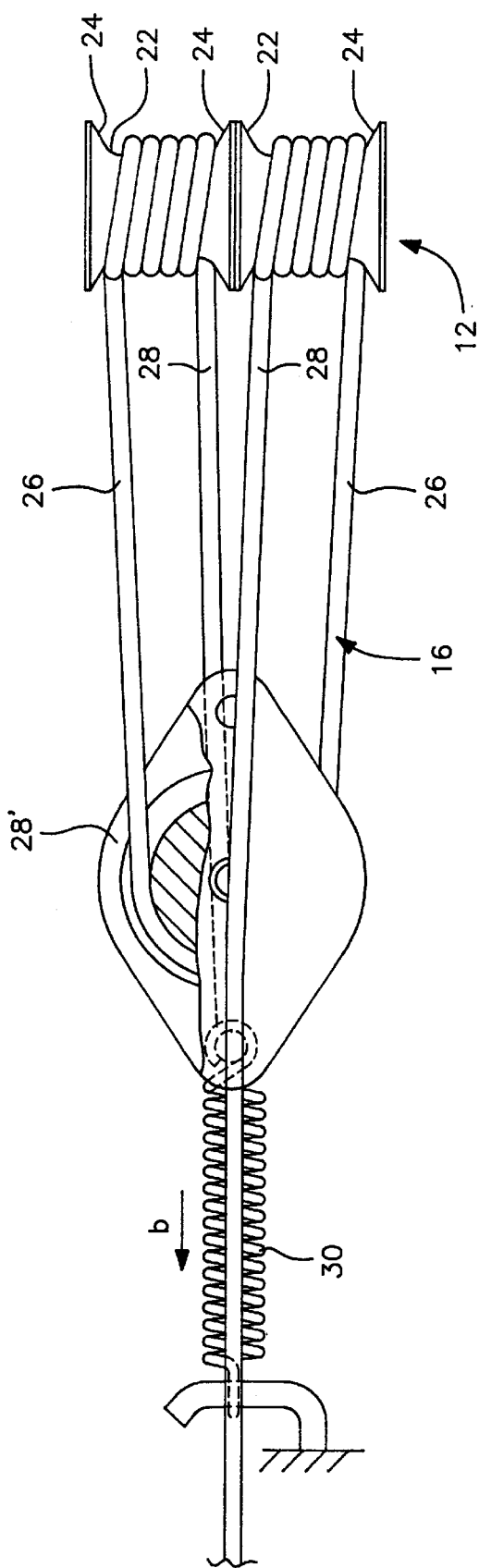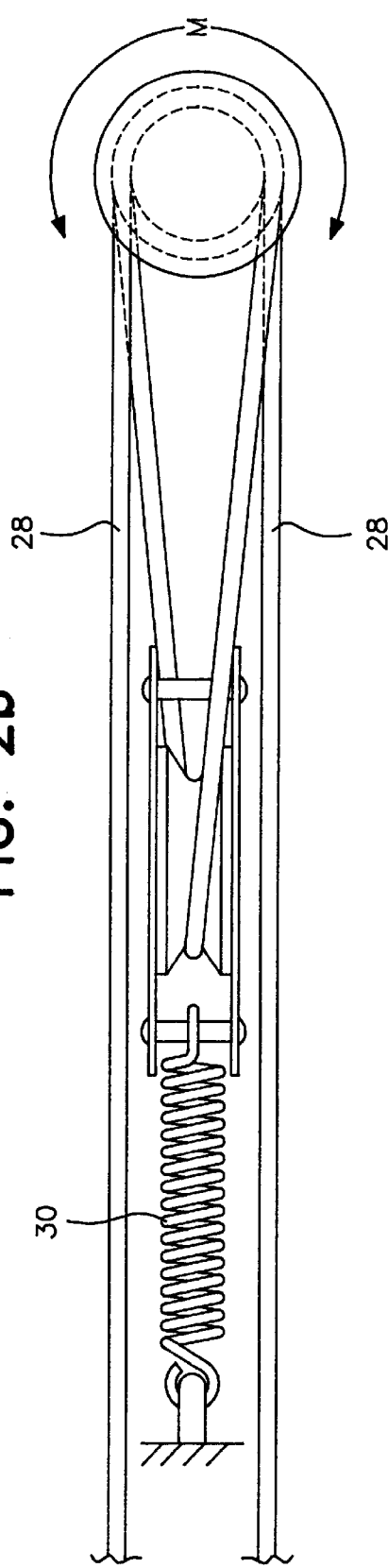

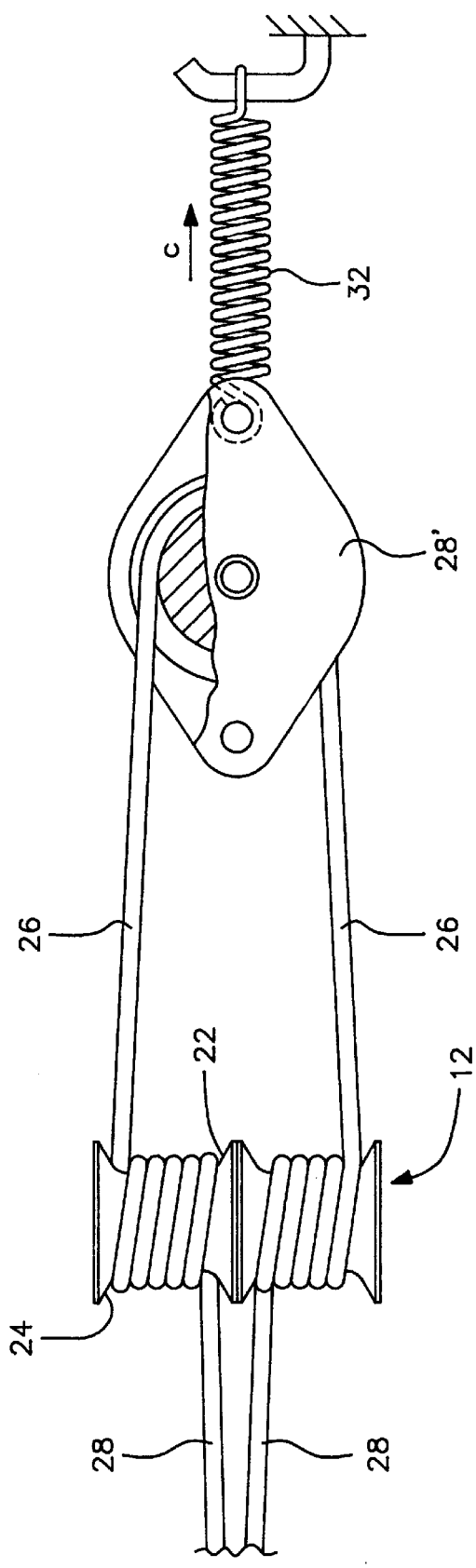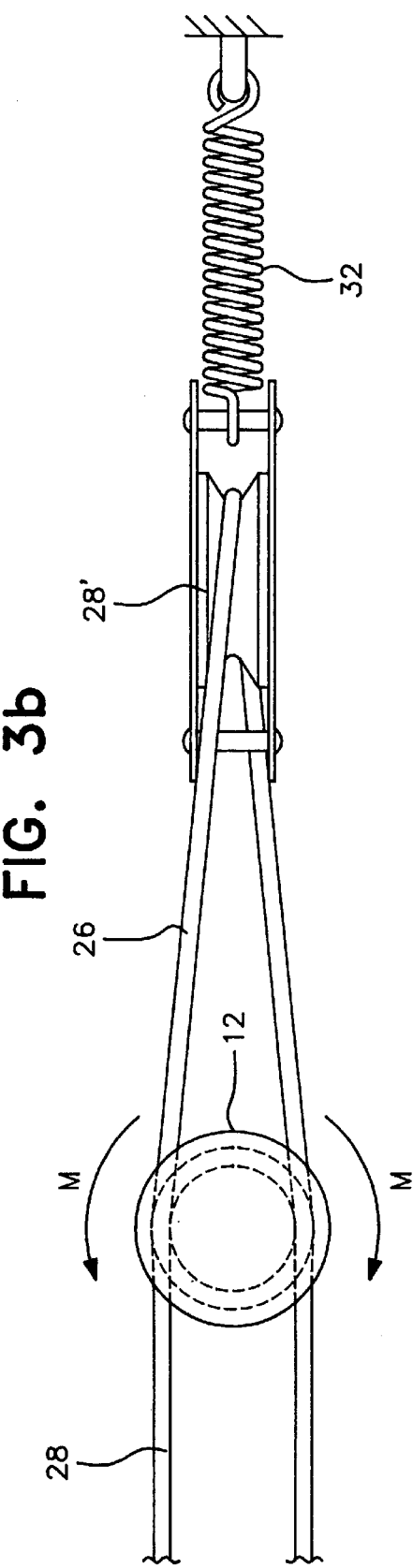
FIG. 3a
FIG. 3b

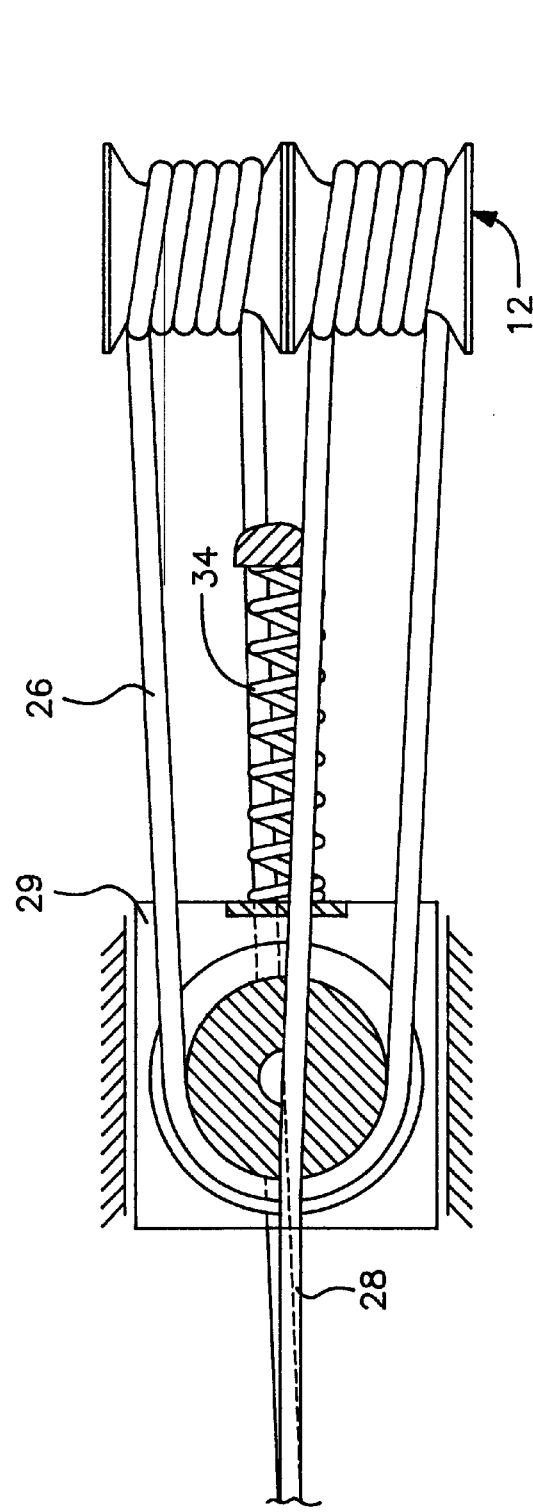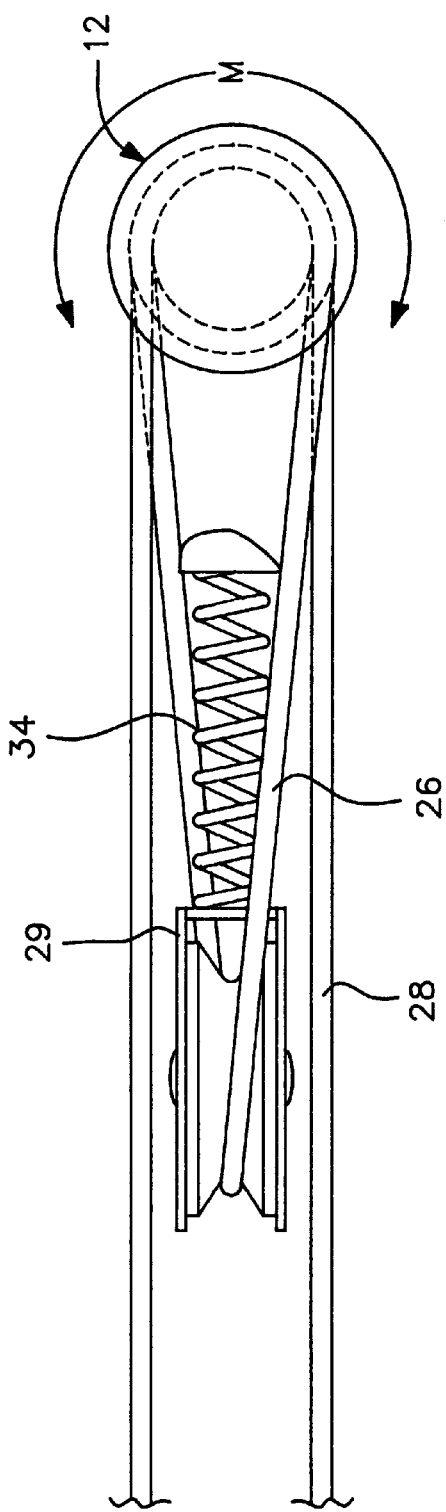
FIG. 4a
FIG. 4b

GATE DRIVE ASSEMBLY

BACKGROUND OF THE INVENTION

1. Field of the Invention

The invention refers to a drive, preferably a gate drive, with a belt transmission comprising of a drive pulley and an output pulley.

2. Description of the Related Art

Such belt transmissions as gate drives are familiar from the prior art as toothed belt transmissions. A motor-driven cog drives a corresponding toothed belt which is led over an idler pulley at the other end consisting of a cog wheel. Due to the size of the individual teeth of the toothed belt and of the corresponding cog, a certain minimum diameter must be maintained in the design of the drive pulley so that the whole drive unit is rather large. As well as this, the toothed belts used are relatively expensive.

A cheaper version consists in the use of roller chains led over corresponding cog wheels. Although roller chains are capable of transmitting very high forces, they cause unacceptable noise emissions in operation. In addition to this, the cog wheels used here also have to have a certain minimum diameter which means that the overall unit is relatively large.

Thus, the task of the present invention is to create a gate drive which, on the one hand can be realised cost-effectively and, on the other hand, can transmit large forces in a compact size.

SUMMARY OF THE INVENTION

In the invention, this task is solved by a drive, preferably a gate drive with a belt transmission having a drive pulley and an output pulley. Accordingly, a drive pulley is formed from at least one cylinder which has flanges tapering inwards at its ends. As a drive element a round belt, rope or similar is wound a number of times around the cylinder. The return strand of the round belt, rope or similar can be held continuously under tension.

In the design of the drive according to the invention the same principle is applied as in electrically driven idler pulleys used particularly in shipping. The corresponding belt is wound around this electrically driven idler pulley a number of times. The belt slips through while the electrically driven idler pulley is rotating until the end of the return strand is subjected to tension. Due to the tension on the return strand a frictional grip is generated between the belt and the electrically driven idler pulley. The force that can be taken up by such a contact transmission with the load strand is expressed after Eytelwein by the following equation:

$$F_1 = F_2 \cdot e^{\mu\alpha}$$

where $F_1$, is the force acting on the load strand, $F_2$ the force acting on the return strand, $\mu$ the coefficient of friction and $\alpha$ the wrap in radian measure.

Up to now there was no simple way of transferring this contact transmission familiar from shipping to a garage gate drive, as in a garage gate drive the reversal of the direction of rotation meant that the load switched between the return strand and the load strand, whereby the belt is forced to slip on the drive pulley when the load is reversed. Due to the design of the drive according to the invention it is now ensured that the round belt, rope or similar serving as the drive element always remains in frictional contact with the drive pulley even when the direction of rotation changes.

In a first preferred version of the invention, the drive pulley consists of two cylinders with flanges tapering inwards on their respective ends, whereby the round belt, rope or similar is wrapped a number of times around each cylinder and whereby the end respectively forming the return strand is led around a spring-loaded idler pulley. This design means that the necessary tension is exercised in a simple manner on the return strand. In this, the idler pulley around which the respective return strand is led, can be arranged between the respective ends of the round belt, rope or similar which respectively form the load strand. Alternatively, the idler pulley may also be arranged outside of the ends of the round belt, rope or similar forming the load strand. The springs exercising the spring force may be realised either as tension or compression springs.

Another alternative version of the drive according to the invention entails the drive pulley consisting of only one cylinder with flanges tapering inwards at its ends. Here the two ends of the round belt, rope or similar are also led over fixed idler elements, between which two idler pulleys are arranged on a moveable carriage arranged perpendicular to the direction of the round belt, rope or similar, around which the round belt, rope or similar is also led. The distance between the pulleys arranged on the carriage is smaller than that between the idler elements opposite each other. In this version when the load strand is tightened it is drawn through on the load side for the most part straight between the rigid idler elements and the idler pulley. The cross-sliding carriage is drawn across to the side to the load strand. The load strand which runs mainly straight along the idler elements and the idler pulley has only a minor contact with the fixed idler elements so that only a negligible frictional force is exercised. The idler element on the return strand of the carriage is drawn inwards by sliding the carriage to the load strand side thereby taking the return strand with it so that the angle of wrap of the return strand around the fixed idler elements on the return strand is enlarged. This generates a relatively large frictional force which is sufficient to generate the required frictional contact between the belt and the drive pulley.

A further design principle for further development of the drive according to the invention consists in the fact that the tension on the return strand is generated by two staggered tensioning elements which work on the principle of a bicycle chain adjuster.

It is an advantage when, at the end of the round belt, rope or similar respectively forming the load strand, there is fixed a carriage with an articulation point, for example for a sectional gate, which can slide back and forth.

It is especially advantageous when an additional tension spring is integrated in the load strand. With this version, a torsion spring, required in the prior art and integrated on the usual spring shaft to roll up the sectional gate, can be replaced. Instead of the usual take-up pulley on which the belt would also be wound up here, in this case the design with the diameter of the correspondingly motor-driven pulley can be retained. With this design the large-diameter take-up pulley as was required in the prior art can be replaced. As well as this, the relatively expensive torsion spring required by the prior art can be replaced by a low-cost linear spring.

BRIEF DESCRIPTION OF THE DRAWINGS

Further details and advantages of the invention are explained in the following in conjunction with the execution examples shown in the drawings. These are:

FIGS. 1a, b: side view and plan view of an initial basic version of the drive according to the invention FIGS. 2a, b: an enlarged detail view of part of FIGS. 1a, 1b FIGS. 3a, b: a detail view corresponding to that in FIG. 2 in a modified version FIGS. 4a, b: a version corresponding to FIGS. 2a, b of a further version of the present invention FIGS. 5a, b: a representation corresponding to FIGS. 2a, b of a fourth version of the present invention

DETAILED DESCRIPTION OF THE PREFERRED EMBODIMENTS

Figure 5A:
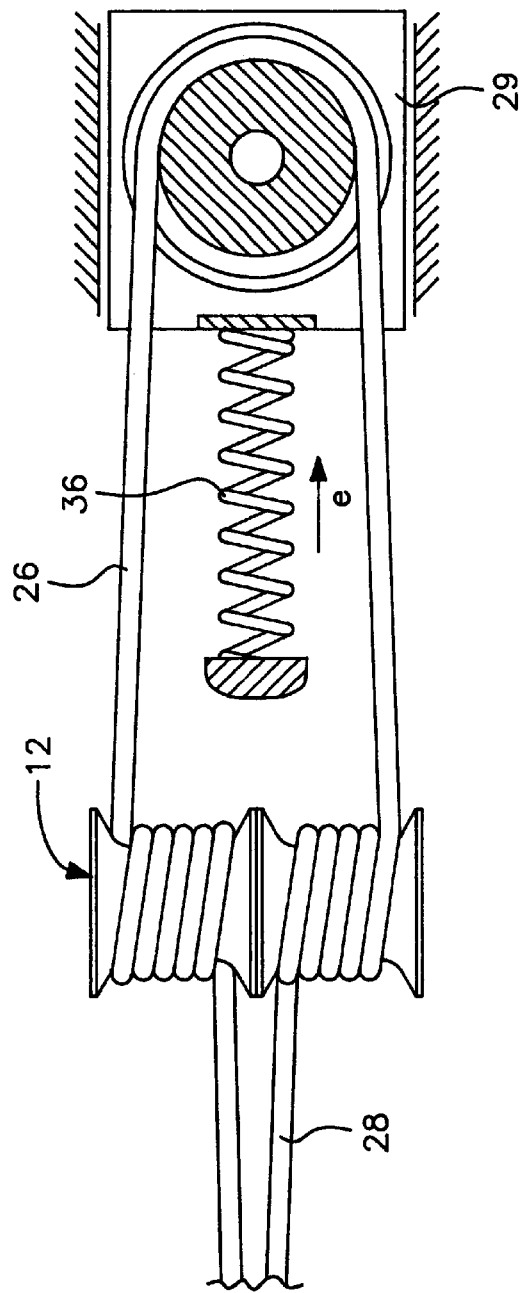

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIGS. 1a and 1b show a gate drive 10 which is integrated in a mounting rail in a manner not shown here. The drive 10 consists of a belt transmission with a drive pulley 12 and an output pulley 14 in the form of an idler pulley. An endless round belt, rope or similar 16 (rope) is led around the drive pulley 12 and the output pulley 14. The round belt, rope or similar 16 moves a carriage 18 back and forth with an articulation point not detailed here in the directions of the double arrows 'a' depending on the direction of drive (double arrows 'M') of the drive pulley 12. The carriage 18 is connected to one end of the round belt, rope or similar 16 by means of a positively interlocking element 20 as shown in FIG. 1b.

As can be seen in FIGS. 2a and 2b, the drive pulley 12 consists here of two cylinders 22 arranged alongside each other on a shaft and with inwardly tapering flanges 24 on the respective ends. The round belt, rope or similar 16 is wound four times around each cylinder 22, and the end forming the return strand 22 in each case is led around a spring-loaded idler pulley 28. In the version shown here the spring-loaded idler pulley 28 lies between the ends of the round belt, rope or similar 16 forming the load strand. In the present example the spring force is provided in the direction of the arrow 'b' by a tension spring 30.

The spring force exerted on the return strand 26 through the idler pulley 28 is sufficient to maintain the frictional contact between the round belt, rope or similar 16 and the drive pulley 12 even when the direction of rotation changes in the directions of the double arrows 'M'.

FIGS. 3a and 3b show a version in which the idler pulley 28' is arranged outside of the ends of the round belt, rope or similar forming the load strand. This allows the realisation of a relatively longer but narrower design version. The idler pulley 28' is also spring-loaded by tension spring 32 in the direction of the arrow 'c'. The other parts correspond to those of the version shown in FIG. 1a or 1b so that reference is made here to the description above.

The FIGS. 4a and 4b show a version corresponding to the design according to FIGS. 2a, 2b in which the idler pulley 29 is spring-loaded by a correspondingly arranged compression spring 34 in the direction of the arrow 'd'. The other parts correspond to the version described above so that reference is made to this description.

Figure 5B:
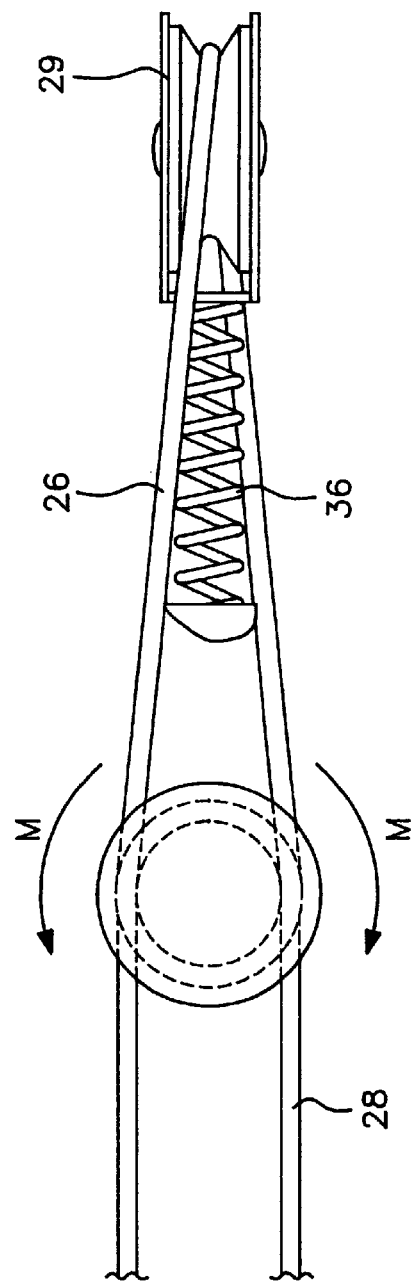

The FIGS. 5a and 5b show a version which corresponds for the most part with that shown in FIGS. 3a and 3b, whereby the spring force in this version is exerted in the direction of the arrow 'e' by a compression spring 36. The other parts correspond to those of the previous version and are thus marked with identical reference symbols.

Figure 6:
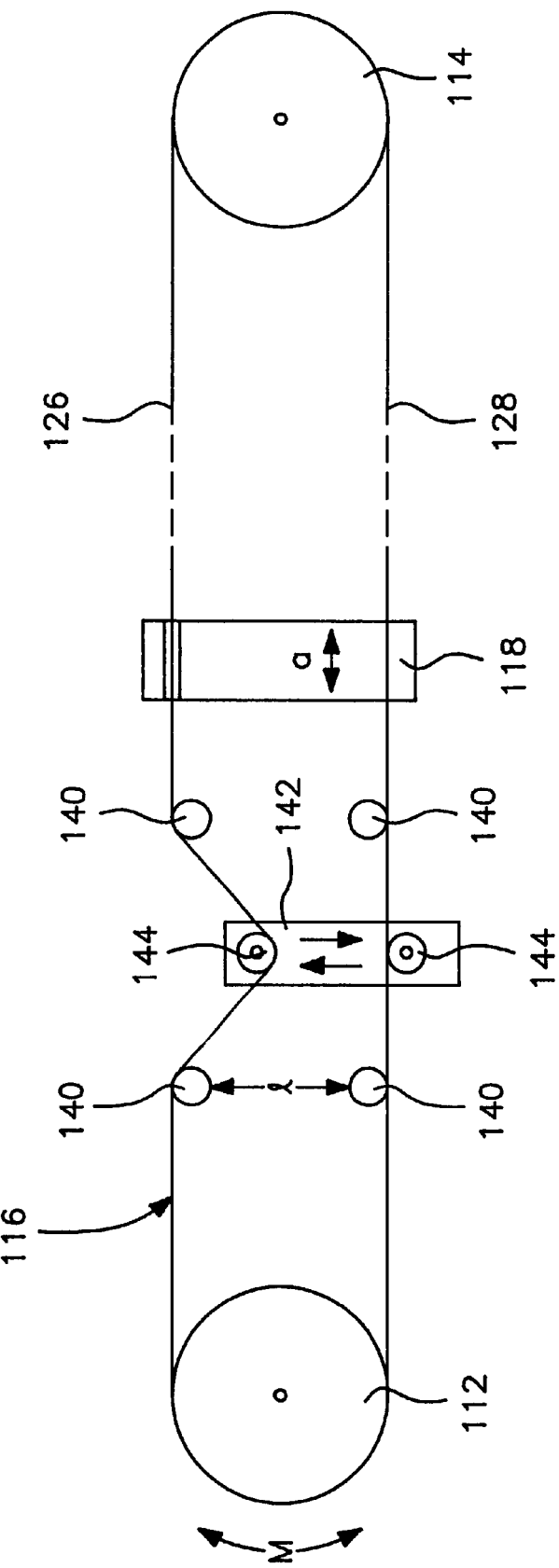
FIG. 6: a plan view of a fifth version of the drive according to the invention

A version of the present invention based on an alternative execution concept is shown in FIG. 6. Here the drive pulley 112 motorically driven in the directions of the double arrows 'M' is formed from a cylinder which has inwardly tapering flanges at its ends. A round belt, rope or similar 116 is wound four times around this cylinder. Opposite the drive pulley 112 is the output pulley 114 also formed from an idler pulley. A carriage or carriage driver 118 can be moved back and forth by the round belt, rope or similar 116 in the directions of the double arrows 'a' corresponding to the direction of rotation of the drive pulley 112. The round belt, rope or similar 116 is led over fixed idler elements 140. In the version shown here the idler elements 140 are arranged in such a way that the parallel ends of the round belt, rope or similar have tangential contact with them. Between each two opposite idler elements 140 there are rotatable idler pulleys 144 arranged on a carriage 142 which can be moved across in the directions of the arrows 'f'. The round belt, rope or similar 116 is led around the idler pulley 144 in the manner shown in FIG. 6. The distance between the idler pulleys 144 pivoted on the carriage 142 is smaller than the distance I between the fixed idler elements 140.

In FIG. 6 the round belt, rope or similar 116 runs on one side mainly straight between the idler elements 140 and the idler pulley 144. On this side the round belt, rope or similar forms the load strand 128 while on the opposite side the round belt, rope or similar 116 forms the return strand 116. The exertion of the load causes the round belt, rope or similar 116 forming the load strand 128 to be pulled straight so that it pushes the carriage 142 into the position shown here, thereby deflecting the return strand 126 as shown in FIG. 6 around the idler elements 140 and the idler pulley 144 in such a way that a comparatively large angle of wrap results at the idler elements 140. This enlarged angle of wrap generates a sufficiently large force to ensure the frictional contact between the round belt, rope or similar 116 and the idler pulley 112. In the case of a change in the direction of rotation in the directions of the double arrows 'M', a direct kinematic reversal is caused due to the directly resulting reversal of the load due to the corresponding lateral movement of the carriage 142 in the direction of the arrows 'f', so that the load strand and the return strand can be changed without any time interval for the transition during which the frictional contact between the round belt, rope or similar 116 and the drive pulley 112 can no longer be maintained.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A gate drive with a belt transmission comprising a drive pulley and an output pulley, the drive pulley including at least one cylinder which has inwardly tapering flanges at its ends, a round belt wound around the cylinder a number of times as a drive element, a return strand of the round belt held continuously under tension, and a carriage with an articulation point which can be moved back and forth by a load strand, said carriage movement being essentially perpendicular to a direction of movement of the load strand between the drive pulley and the output pulley.

2. The gate drive according to claim 1, wherein the drive pulley includes two cylinders with inwardly tapering flanges at their respective ends, whereby the round belt is wound a number of times around each cylinder and whereby the return strand is led around a spring-mounted idler pulley.

3. The gate drive according to claim 1, wherein a tension spring is integrated in the load strand.

4. The gate drive according to claim 1, wherein the gate drive operates to move a sectional gate.

5. The gate drive according to claim 1, wherein the round belt is a rope.

6. The gate drive according to claim 1, wherein the direction of movement of the carriage is essentially perpendicular to the direction of movement of the load strand between the drive pulley and the output pulley.

7. The gate drive according to claim 2, wherein the spring-mounted idler pulley around which the return strand is led lies along a part of the round belt forming the load strand.

8. The gate drive according to claim 2, wherein the spring-mounted idler pulley around which the return strand is led lies outside of a part of the round belt forming the load strand.

9. The gate drive according to claim 7, wherein the spring is a tension spring.

10. The gate drive according to claim 7, wherein the spring is a compression spring.

11. The gate drive according to claim 7, wherein the drive pulley includes a cylinder with inwardly tapering flanges at its axial ends, both the load strand and the return strand of the round belt being led over fixed idler elements, between which idler pulleys are arranged on a cross-sliding carriage around which the round belt is also led, whereby a distance between the pulleys arranged on the carriage is smaller than a distance between the fixed idler elements on the load strand of the round belt with respect to opposing fixed idler elements on the return strand of the round belt.

12. A gate drive with a belt transmission, comprising a drive pulley and an output pulley, the drive pulley including at least one cylinder, a round belt wound around the cylinder a number of times as a drive element, a return strand of the round belt held continuously under tension, and a carriage with an articulation point which is moved back and forth by a load strand, the direction of movement of the carriage being substantially perpendicular to the direction of movement of the load strand and the return strand between the drive pulley and the output pulley, such that movement of the carriage causes one of the load strand and the return strand to be deflected depending on a direction of rotation of said drive pulley.

13. The gate drive as set forth in claim 12, further comprising two fixed idler elements on a side of the return strand and two fixed idler elements on a side of the load strand, said carriage having a first idler element on the side of the return strand and a second idler element on the side of the load strand, wherein when the load strand is tightened it is drawn through substantially straight between the fixed idler elements and the second idler element on the load strand side, said carriage sliding to the load strand side such that the first idler element and said return strand are drawn inwardly, enlarging an angle of wrap of the return strand around the fixed idler elements on the return strand side and increasing frictional force.

14. The gate drive according to claim 13, wherein a distance between the first and second idler elements is smaller than a distance between the fixed idler elements on the load strand side with respect to opposing fixed idler elements on the return strand side.

* * * * *